(12) United States Patent  
Houser

(10) Patent No.: US 7,233,401 B1
(45) Date of Patent: Jun. 19, 2007

(54) METHOD AND APPARATUS FOR MEASURING THICKNESS OF A MATERIAL

(75) Inventor: Glenn Houser, La Canada, CA (US)

(73) Assignee: Foothill Instruments, LLC, La Canada, CA (US)

( * ) Notice: Subject to any disclaimer, the term of this patent is extended or adjusted under 35 U.S.C. 154(b) by 330 days.

(21) Appl. No.: 10/625,830

(22) Filed: Jul. 22, 2003

Related U.S. Application Data

(60) Provisional application No. 60/486,371, filed on Jul. 11, 2003.

(51) Int. Cl.
*G01B 11/06* (2006.01)
(52) U.S. Cl. ...................... 356/503; 356/632
(58) Field of Classification Search ............... 356/630, 356/632, 503, 504
See application file for complete search history.

(56) References Cited

U.S. PATENT DOCUMENTS

| | | | | |
|---|---|---|---|---|
| 3,737,237 A | * | 6/1973 | Zurasky | 356/632 |
| 4,676,647 A | * | 6/1987 | Kikkawa et al. | 356/632 |
| 4,885,709 A | * | 12/1989 | Edgar et al. | 356/632 |
| 4,899,055 A | * | 2/1990 | Adams | 356/632 |
| 5,357,336 A | * | 10/1994 | Ruhl, Jr. et al. | 356/402 |
| 5,666,394 A | | 9/1997 | Swanson | |
| 5,739,906 A | | 4/1998 | Evans et al. | |
| 5,943,134 A | | 8/1999 | Yamaguchi et al. | |
| 6,025,916 A | * | 2/2000 | Quick et al. | 356/632 |
| 6,198,294 B1 | | 3/2001 | Black | |
| 6,208,425 B1 | | 3/2001 | Sandhu et al. | |
| 6,261,152 B1 | | 7/2001 | Aiyer | |
| 6,271,047 B1 | | 8/2001 | Ushio et al. | |
| 6,353,473 B1 | | 3/2002 | Ishimori et al. | |
| 6,368,881 B1 | | 4/2002 | Brouillette et al. | |
| 6,392,756 B1 | * | 5/2002 | Li et al. | 356/632 |
| 6,437,868 B1 | | 8/2002 | Coult et al. | |
| 6,483,589 B1 | | 11/2002 | Suzuki et al. | |
| 6,611,338 B1 | | 8/2003 | Knuttel et al. | |

* cited by examiner

*Primary Examiner*—Richard A. Rosenberger
(74) *Attorney, Agent, or Firm*—Buchanan Ingersoll & Rooney LLP

(57) ABSTRACT

A method and apparatus for measuring wafers, thin films, or other planar layers are disclosed. This invention utilizes a tunable, monochromatic light source reflected from or transmitted through the layer to be measured. The wavelengths of light are selected such that the light is partially transmitted through the material to be measured so as optical interference is seen among the interfaces of the layer(s). The wavelengths are also controlled to sufficiently small increments to resolve these interference features. This apparatus relates to the need to monitor wafer thinning, film deposition, and other semiconductor device related processes.

31 Claims, 4 Drawing Sheets ized spectroscopy system of the present invention.

METHOD AND APPARATUS FOR MEASURING THICKNESS OF A MATERIAL

CLAIMS THE BENEFIT TO PROVISIONAL APPLICATION

Pursuant to title 35, United States Code, Section 119(e) of the United States, this application claims benefit to the prior provisional patent application 60/486,371, filed on Jul. 11, 2003, the entire disclosure of which is hereby incorporated-by-reference for all purposes.

FIELD OF THE INVENTION

The present invention relates to an optical spectroscopic measurement system used to precisely determine the thickness of a layer of material typically of a semiconductor wafer.

BACKGROUND OF THE INVENTION

Considerable interest exists in determining the thickness of thin films used in the manufacture of micro-electronic, micro-optic, and micro-mechanical devices. Such measurement devices typically utilize visible light and are used to measure films of thickness on the order of the wavelength of light or less. Measurement of thicker materials such as semiconductor wafers is generally done with mechanical means. Thicknesses of semiconductors which are thinner than the typical wafer thickness of 200 microns or more, however, currently are difficult to measure. Their thinness makes them too fragile to touch mechanically. One technique utilizes single wavelength optical interference to measure a differential thickness change either from one portion of the wafer relative to the thinned part, or from a known value prior to thinning. Using this technique, optical interference occurs outside of the measured material rather than within it. Another technique measures the capacitance between electrodes above and below the wafer. This invention solves the problem of direct measurement of the thickness of such a layer, done with a non-contact, optical technique, with a high degree of accuracy.

SUMMARY OF THE INVENTION

The present invention provides an optical spectroscopic measurement system used to precisely determine the thickness of a layer of material and a method of measuring material thickness using the system.

In the spectroscopic system aspect of the invention, a system is provided that includes the following elements: a material; a tunable light source, wherein the source provides a beam of light incident to the material; a first detector that detects light from the light source either reflected or transmitted through the material; and, a computing device that computes the material thickness based on data received from the detector.

In the method aspect of the invention, a method of measuring material thickness is provided that includes the following steps: loading the material to be measured into a holder of a spectroscopic system, wherein the system comprises a tunable light source which provides a beam of light incident to the material, a detector which detects light from the light source either reflected from or transmitted through the material, and a computing device that computes the material thickness based on data received from the detector; measuring the light reflected from or transmitted through the material at least two different wavelengths using the detector; and, computing material thickness using a computing device based on data received from the detector.

DETAILED DESCRIPTION OF THE PREFERRED EMBODIMENTS

Figure 1:
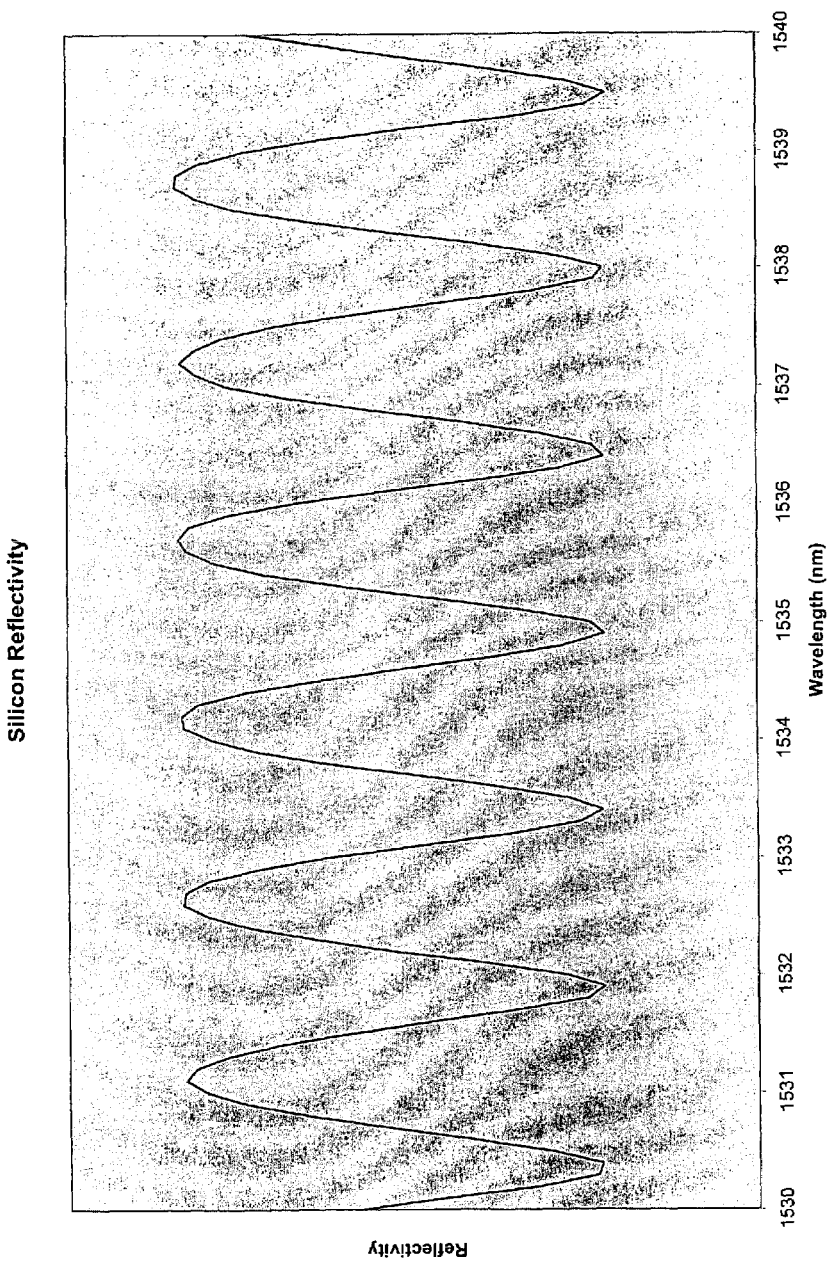
FIG. 1 depicts the reflectivity of a 200 μm thick layer of silicon.

An objective of the invention is the determination of the thickness of a material quickly, accurately, and without contact, by means of measuring the material's reflectivity or transmissivity at multiple wavelengths at which the material is at least partially transparent.

The typical material is a silicon wafer which has been thinned, yet whose top and bottom surfaces remain co-planar enough to provide some optical interference between the surfaces. Preferably, the top and bottom surfaces vary less than 1 wavelength of light over an area having a 100 μm diameter. More preferably, the top and bottom surfaces vary less than 1 wavelength of light over the same area. Currently available measurement instruments which operate using visible light are unable to determine the thickness of the silicon, which is opaque to such light. This invention utilizes infrared light which is able to partially transmit through the material. Semiconductors become transparent at energies less than their bandgap energy; the bandgap of silicon is 1.1 eV, corresponding to a 1 micron wavelength. This technology can be used to measure semiconductors transparent to the operating wavelength such as GaAs, SiC, SiGe, GaN, and InP. It may also be used to measure relatively thick organic films, such as dielectric films (e.g., photoresists).

The material may have coatings of other materials on either side, or may be immersed in liquid, gas, or vacuum. Any coatings on the side of the incident light must be partially transparent to the light; coatings on the side opposite the incident light may be non-transparent, such as metals. Typical coating materials used in semiconductor process are photoresists, insulators such as silicon dioxide, and conductors.

A beam of light composed of or tunable over multiple, distinct wavelengths is incident upon the layer of material whose complex refractive index is known. By measuring the incident and reflected light intensity, the material's reflectivity at each wavelength may be determined by utilizing the Fresnel formulae. See, "Principles of Optics," Born & Wolf, 6$^{th}$ ed., Pergamon Press, Oxford 1980, p. 38–42. These relationships associate reflectivity and transmissivity as a function of polarization of the light, wavelength, angle of incidence, and complex refractive indexes of the materials. Similarly by measuring the incident and transmitted light intensity, the material's transmissivity at each wavelength may be determined.

By knowing the polarization of the incident light, the material's complex refractive index and either its reflectivity or transmissivity at the multitude of wavelengths, the thickness of the material may be determined. The first step is to calculate the power reflectivity of the sample under test. This is calculated using Fresnel's equations to calculate the amplitude reflectivity at each material boundary, coupled with a computation of the phase change induced by transmission through each layer. At normal incidence the amplitude reflectivity simplifies to:

$$R_{TM}=(n-1)/(n+1) R_{TE}=-(n-1)/(n+1)$$

where "TM" signifies "transverse magnetic field polarization, "TE" signifies "transverse electric field polarization," and "n" is the ratio of complex refractive indexes of the two materials on either side of the boundary. The amplitude reflectivity within the layer is computed as:

$$R=\exp(-j4\pi nd/\lambda)$$

where "n" is the complex refractive index of the material, "d" is the thickness of the material, and λ is the wavelength. The total power reflectivity is obtained by squaring the complex amplitude reflectivity. For each wavelength, a periodic array of possible thickness solutions exist. By utilizing multiple wavelengths, a single thickness solution is possible. Increasing the number of wavelengths improves the accuracy of the measurement.

A typical reflectivity as a function of wavelength for a silicon layer is shown in FIG. 1. This is the reflectivity of a 200 μm thick silicon layer. The separation of the measurement wavelengths must be less than half of the period of the oscillations which occur in the reflectivity and transmissivity in order to resolve such oscillations.

To facilitate measurements and optical alignment, the incident light angle should be as close to normal to the surface as possible. Preferably, the incident light angle is less than ±10° from normal. More preferably, the incident light angle is less than ±7.5° from normal. More preferably, the incident light angle is less than ±5° from normal. The region of the wafer illuminated should also be as small as possible to reduce the effects of thickness non-uniformity. Preferably, the illuminated region is a roughly spherical area less than 200 μm in diameter. More preferably, the illuminated region is a roughly spherical area less than 150 μm in diameter. Most preferably, the illuminated region is a roughly spherical area less than 100 μm in diameter. Measurement of patterned areas of the wafer are possible providing the desired measurement location on the wafer may be positioned within the light's area.

The typical thickness range of a material measured using the apparatus and method of the instant invention is 1 μm to 1000 μm. Oftentimes, the thickness range is 50 μm to 500 μm or 1 μm to 150 μm. Repeatability of the thickness measurement—in other words, the repeated measurements' standard deviation—is less than 2%. Preferably, the standard deviation is less than 1%. More preferably, the standard deviation, expressed in a unit of measurement, is less than 20 nm or even less than 15 nm.

The first embodiment uses a quasi-monochromatic light source (laser) capable of varying its wavelength. The detection is done by means of a photodiode sensor. The laser is tuned to a specific wavelength, a portion of the light is reflected upon or transmitted through the wafer under test, and a portion of the light is detected by the sensor. The wavelength of the light is varied, with the reflection or transmission measured at each wavelength. Typically, the wavelength of light is varied in increments less than 1 nm. Preferably, the wavelength is varied in increments less than 0.5 nm. More preferably, the wavelength is varied in increments of about 0.1 nm. The resulting reflectivity or transmission versus wavelength allows computation of the optical thickness of the sample, as summarized below.

A second embodiment uses a broadband light source with a spectrometer detection system to separate the wavelengths of light. Light from this source is reflected upon or transmitted through the wafer under test, and a portion of the light is detected by the spectrometer. The spectrometer separates the light into discrete wavelengths, producing the reflectivity or transmission version wavelength information. The computation of thickness is as in the first embodiment.

A curve-fitting technique is used to match the best theoretical model of reflectivity or transmission as a function of optical thickness with the measured value. Optical thickness is the product of the true thickness with the optical refractive index. By prior knowledge of the refractive index of the materials measured, the actual sample thickness is thus determined. This technique may be extended to multiple layers of different materials, so that the thickness of both the wafer and a layer such as photoresist on the wafer may be simultaneously measured.

Figure 2:
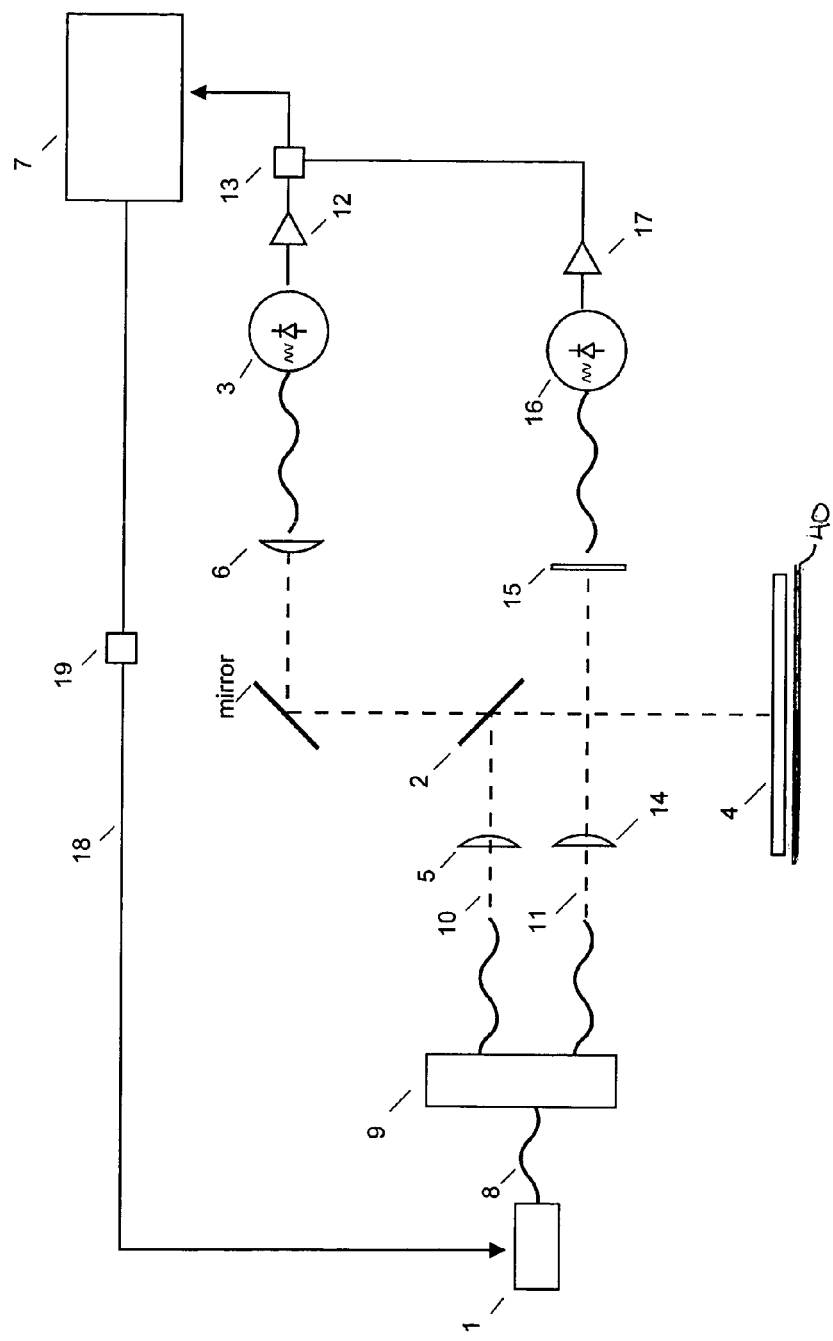
FIG. 2 depicts a preferred embodiment of a spectroscopy system of the present invention.

The spectroscopy system in the preferred embodiment is depicted in FIG. 2 and is described in reference to the figure. The system includes a narrow-band tunable wavelength source 1, which is typically a laser with light output that may be precisely controlled and varied in wavelength. Such lasers are commercially available, for example, from New Focus of San Jose, Calif. Wavelength source 1 is connected to a fiber optic splitter 9 through fiber optic cable 8. Fiber optic splitter 9 is used to split the laser output into a measurement light path 10, which is directed to the sample under test 4, and a reference light path 11, which is used to calibrate wavelength.

Measurement light path 10 passes through a collimating/focusing lens 5, which is typically pigtailed. A portion of the light is directed to the sample under measurement 4—which is typically positioned on a chuck (40) for reflectivity measurements or on a metal ring that is open in the middle (not shown) for transmissivity measurements—by means of a partially transmitting beamsplitter 2. The light reflects from the sample 4, passes (partially) through the beamsplitter 2 again, and is directed toward photosensitive detector 3. Such detectors are commercially available, for example, from Fujitsu Corporation. A defocusing lens 6 may be used to reduce area of the light reflected from the sample which reaches the detector (known as the measurement spot size). Additionally, this lens helps to correct for curvature in the sample surface by allowing some light reflected at non-normal incidence to reach the detector. The detector 3 is typically a photodiode sensitive to the wavelengths of light of the laser source with an integrated fiber optic "pigtail." Its sensitive area is very small in order to further limit the measurement spot size.

The thickness of the sample to be measured generally needs to be uniform to less than a fraction of the light's wavelength across the measurement spot. Minimizing this measurement spot increases the non-uniformity or surface variations allowed in the sample. The current output of the detector 3 is converted to a voltage by means of electrical amplifier 12, and an analog to digital converter 13 provides output to a data acquisition system within computing device 7. Typically, computing device 7 is a general purpose computer or any processor, where operation of the processor is directed by firmware or software. Computing device 7 also acts to control the output of wavelength source 1 by providing a wavelength control signal 18—after conversion of a digital signal to an analog signal by means of digital to analog converter 19—which is a voltage used to tune the laser wavelength.

Reference light path 11 passes through a collimating lens 14 and onto a reference etalon 15. Etalon 15 is a layer of material, such as silicon, whose thickness is precisely known. The reflectivity of this etalon produces a curve of known shape. As the light wavelength is tuned, the transmitted (or reflected) signal amplitude follows a theoretically known curve. Light transmitted through etalon 15 is detected by photosensitive detector 16, which produces a current output. The current output is converted to a voltage by means of electrical amplifier 17, and analog to digital converter provides output to computing device 7.

All the elements of the spectroscopic system, or a portion thereof, may be included in a single housing (not shown in FIG. 2). Typically, elements 7, 18, and 19 are not included in a housing with the other elements.

Figure 3:
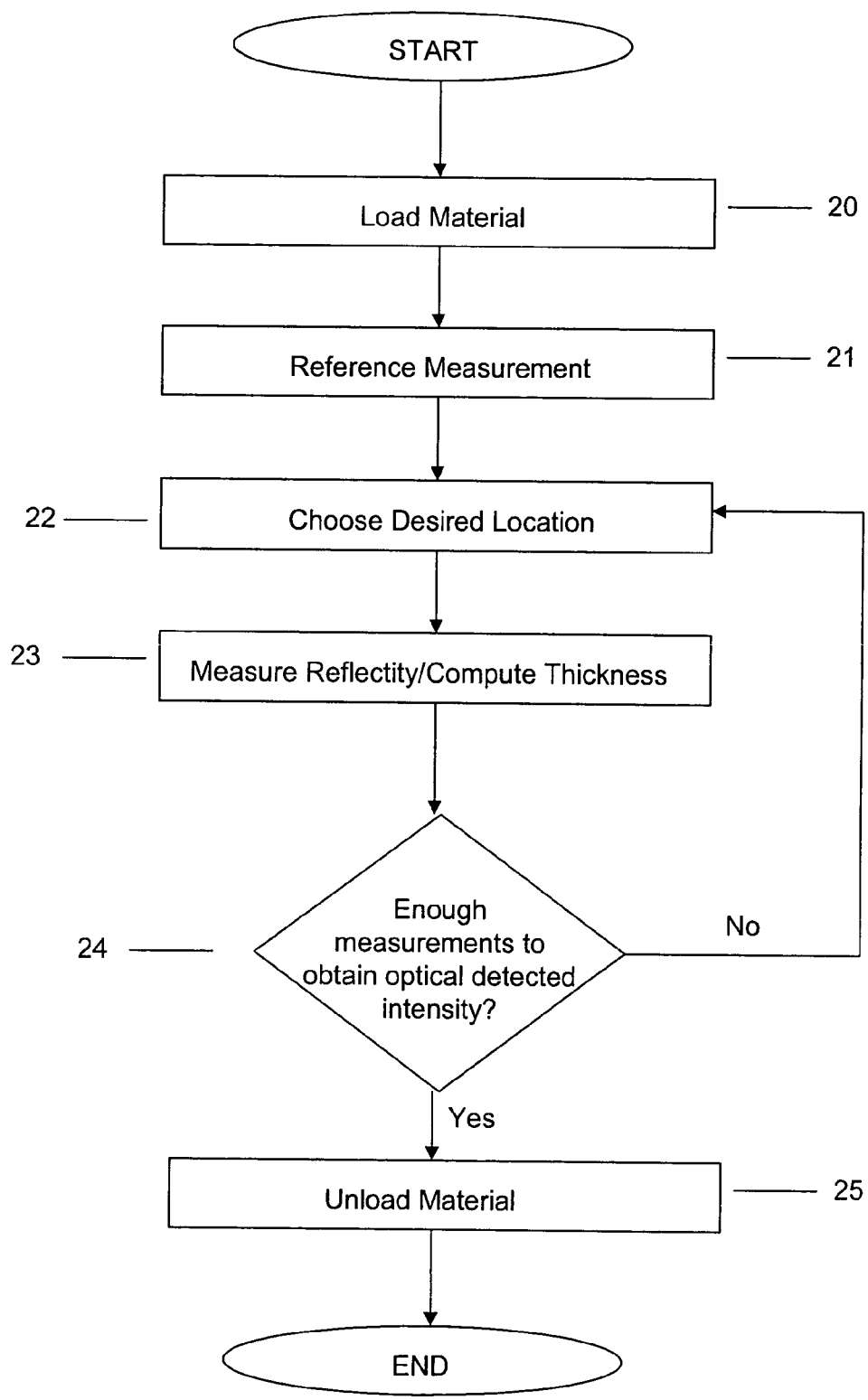
FIG. 3 depicts a flow chart of a method for measuring material thickness using the spectroscopy system of the present invention.

A method of operating the spectroscopic system is described in reference to the flow chart depicted in FIG. 3. In step 20, a material (e.g., silicon wafer) is loaded into the apparatus. A reference measurement 21 is taken using a sample of known reflectivity, such as gold. A desired location on the material for measuring thickness is chosen in step 22, sample reflectivity is measured and sample thickness is computed (Step 23). Steps 22 and 23 are repeated over a band of discrete wavelengths until the resulting optical detected intensity as a function of wavelength is obtained. The wavelength increment is chosen to be less than half of the period of oscillation of sample's reflectivity to fully determine the thickness. For a 100 um thick sample of silicon, this increment must be less than about 400 pm. When it is determined that enough measurements to obtain optical detected density have been taken (Step 24), the material is then unloaded from the apparatus (Step 25).

Figure 4:
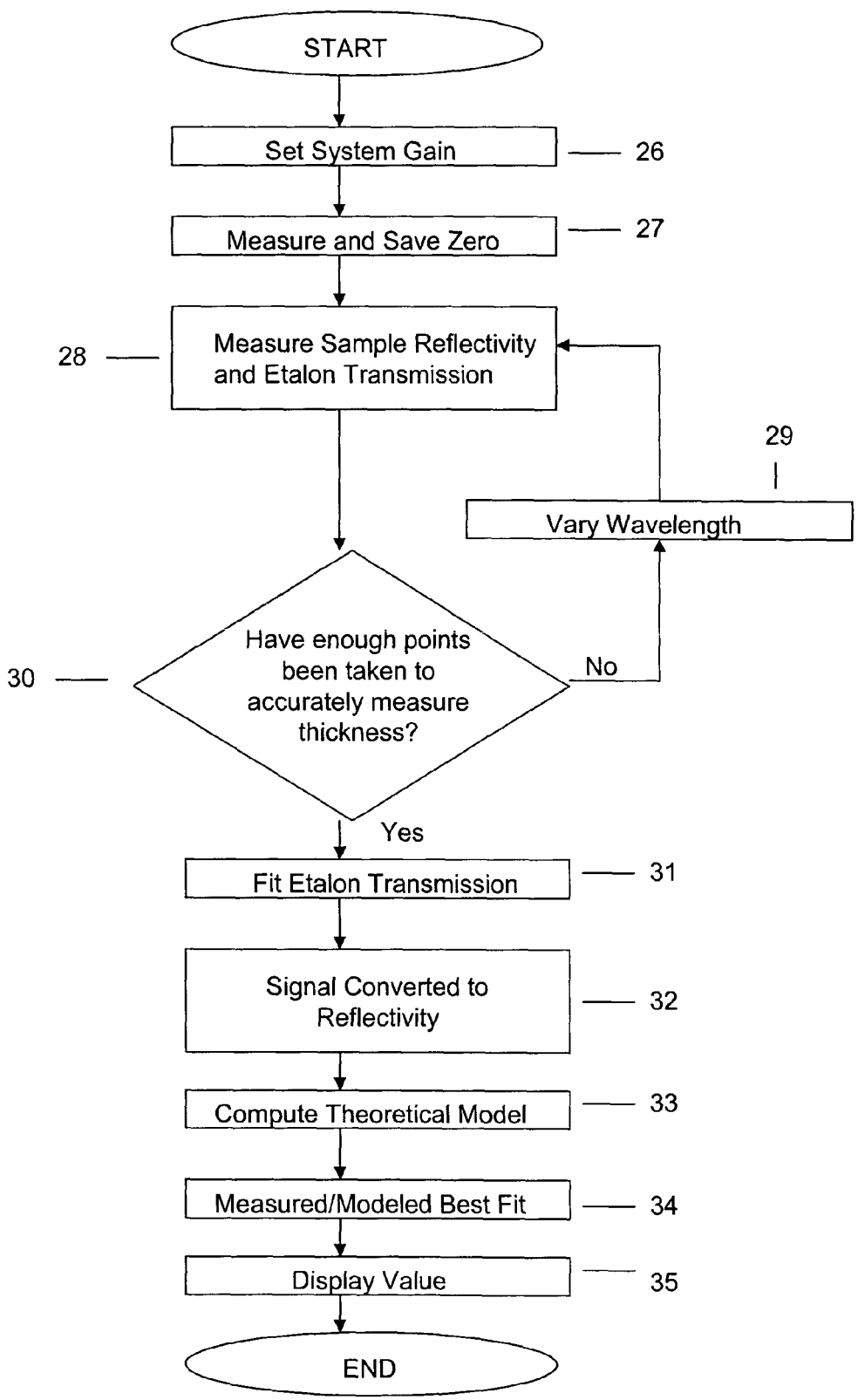
FIG. 4 depicts a flow chart of a method for computing material thickness using the spectroscopy system of the present invention.

A method of computing material thickness is described in reference to the flow chart depicted in FIG. 4. In step 26, the system gain, which is proportional to reflectivity/(A/D counts) at each wavelength, is set by measuring and saving values for a reference (e.g., gold). A/D counts with no sample present are taken to measure and save "zero" (Step 27). Sample reflectivity and etalon transmission at a fixed wavelength point are measured at step 28. When it is determined that enough points (measurements) have been taken (Step 30) to accurately measure the material thickness, etalon transmission is fitted to theoretical values to determine the actual wavelength at each point (Step 31). If enough points have not been taken, then the wavelength is varied by changing the tuning voltage to the laser (Step 29), and steps 28 and 29 are repeated over a number of points until enough points have been taken to accurately measure the material thickness.

At step 32, sample signal is converted to reflectivity using the reference data. This step provides reflectivity as a function of wavelength. A theoretical model of sample reflectivity is computed for a guess thickness (Step 33). The value of sample thickness is then varied until a best fit occurs between measured and modeled thickness values (least square fit of R($\lambda$)) at step 34. The thickness value is then displayed (Step 35).

The primary utility of the described optical spectroscopic measurement system is the measurement of material thickness (e.g., thickness of silicon wafers). Within this use, there are areas of particular relevance for the technology. Such areas include, without limitation, the following: measuring wafer thickness during spin etching; measuring the thickness of bumped wafers; and, measuring the thickness of gallium arsenide containing materials (e.g., gallium arsenide wafers). This method also is useful for the production of wafers for inclusion in smart cards.

Other embodiments of the invention include, but are not limited to, transmission mode and continuous scanning. For transmission mode, in reference to FIG. 2, beamsplitter 2 is replaced with a mirror, and detector 3, collimating lens 5, and optical element 6 are placed on the opposite side of sample 4.

The invention claimed is:

1. A spectroscopic system for measuring thickness of a planar material using interferometry internal to the material, the system comprising:
    a quasi-monochromatic, tunable infra-red light source which provides wavelengths of light varied in increments of less than 0.5 nm;
    a photodetector that detects light reflected from or transmitted through the material;
    a computing device to calculate the material's transmission or reflectivity based on an interference signal from the photodetector, and wherein the material's transmission or reflectivity is used to calculate the thickness of the material based on a knowledge of a material's refractive data; and
    wherein the material to be measured has a thickness of 1 to 1000 microns, and the wavelength of operation of the light source is greater than 1000 nm.

2. The system of claim 1, further comprising a beamsplitter, wherein the beamsplitter divides the beam of light from the source into a measurement light path and a reference light path, and wherein the measurement light path is directed to the material, and wherein the reference light path is used to calibrate light wavelength.

3. The system of claim 2, further comprising a photosensitive detector that detects a reference light signal.

4. The system of claim 1, wherein the tunable light source provides wavelengths of light varied in increments less than 0.1 nm.

5. The system of claim 1, wherein the light source provides a beam of light to the material, and wherein the incident light angle is less than ±5° from normal.

6. The system of claim 1, wherein the material to be measured is a silicon layer having a thickness of 1 to 1000 microns.

7. The system of claim 1, wherein the material to be measured is a GaAs layer having a thickness of 1 to 1000 microns.

8. The system of claim 1, wherein the material to be measured is a dielectric layer having a thickness between 10 and 2000 microns.

9. The system of claim 1, wherein the material to be measured must be partially transparent to the wavelengths of light.

10. A spectroscopic system for measuring thickness of a planar material using interferometry internal to the material measured comprising:
    a quasi-monochromatic infra-red light source able to vary its wavelength in increments of less than one nanometer;
    a photodetector to measure the reflected or transmitted light;
    a computing device to calculate the material's transmission or reflectivity based on the interference signal from the detector, and wherein the material's transmission or reflectivity is used to calculate the thickness of the material based on a knowledge of a material's refractive data; and wherein the material to be measured has a thickness of 1 to 1000 microns, and the wavelength of operation of the light source is greater than 1000 nm.

11. The spectroscopic system according to claim 10, further wherein the quasi-monochromatic infra-red light source varies its wavelength in increments of less than one nanometer over a range of at least 30 nm.

12. The spectroscopic system according to claim 10, wherein the material measured is a silicon layer having a thickness of between 1 and 1000 microns.

13. The spectroscopic system according to claim 10, wherein the material measured is a GaAs layer having a thickness of between 1 and 1000 microns.

14. The spectroscopic system according to claim 10, wherein the material measured is a dielectric layer having a thickness of between 10 and 2000 microns.

15. The spectroscopic system according to claim 10, further comprising a beamsplitter either internal to the light source system or external, which divides the light into a reference path used to calibrate the wavelengths of light.

16. The spectroscopic system according to claim 15, wherein the photodetector comprises:
a first detector that detects light from the light source either reflected from or transmitted through the material; and
a second detector that detects the reference light.

17. The spectroscopic system according to claim 16, wherein the first detector is a photodiode sensor.

18. The spectroscopic system according to claim 16, wherein the first detector detects light reflected from the material.

19. The spectroscopic system according to claim 16, wherein the first detector detects light transmitted through the material.

20. The spectroscopic system according to claim 10, wherein the tunable infra-red light source provides wavelengths of light varied in increments less than 0.5 nm.

21. The spectroscopic system according to claim 10, wherein the light source provides a beam of light to the material, and wherein the incident light angle is less than ±5° from normal.

22. A method of measuring material thickness, wherein the method comprises:
loading a material to be measured into a holder of a spectroscopic system, the material having a thickness of 1 to 1000 microns, wherein the system comprises:
a quasi-monochromatic infra-red light source having a wavelength of operation of greater than 1000 nm, and wherein the light source is able to vary its wavelength in increments of less than one nanometer;
a photodetector to measure the reflected or transmitted light; and
a computing device to calculate the material's transmission or reflectivity based on the interference signal from the detector, and wherein the material's transmission or reflectivity is used to calculate the thickness of the material based on a knowledge of a material's refractive data;
measuring the light reflected from or transmitted through the material at least two different wavelengths using the photodetector; and
computing material thickness using a computing device based on data received from the detector.

23. The method according to claim 22, wherein the detector is a photodiode sensor.

24. The method according to claim 22, wherein the two different wavelengths vary by less than 0.5 nm.

25. The method according to claim 22, wherein the method is used to measure material thickness in the range of 1 microns to 1000 microns.

26. The method according to claim 22, wherein the method provides a repeatability of thickness measurement of less than 1%.

27. The method according to claim 22, wherein the tunable light source provides wavelengths of light varied in increments less than 0.5 nm.

28. The method according to claim 22, wherein computing the material thickness comprises:
measuring sample reflectivity or transmission and etalon transmission at a fixed wavelength point;
varying the wavelength at which measurements of reflectivity or transmission are measured;
repeating the steps of measuring sample reflectivity or transmission and etalon transmission at a fixed wavelength point and varying the wavelength at which measurements of reflectivity or transmission are measured over a number of points to provide a number of sample signals and etalon signals; and
using data obtained from the sample signals and etalon signals to calculate material thickness.

29. The method according to claim 28, wherein computing the material thickness further comprises:
measuring and saving values for a reference;
using the reference values to convert sample signals to reflectivity values; and,
using the reflectivity values to calculate material thickness.

30. The method according to claim 29, wherein computing the material thickness further comprises:
computing a theoretical model of sample reflectivity, wherein the model includes values; and,
varying the value of sample thickness until a best fit occurs between theoretical sample reflectivity values and measured sample reflectivity values, which provides a material thickness.

31. The method according to claim 30, wherein a curve-fitting technique is used to fit the theoretical model of sample reflectivity and measured reflectivity values.

* * * * *